May 15, 1951  A. F. BARHORST  2,553,229
PORTABLE DERRICK
Filed June 7, 1948   2 Sheets-Sheet 1
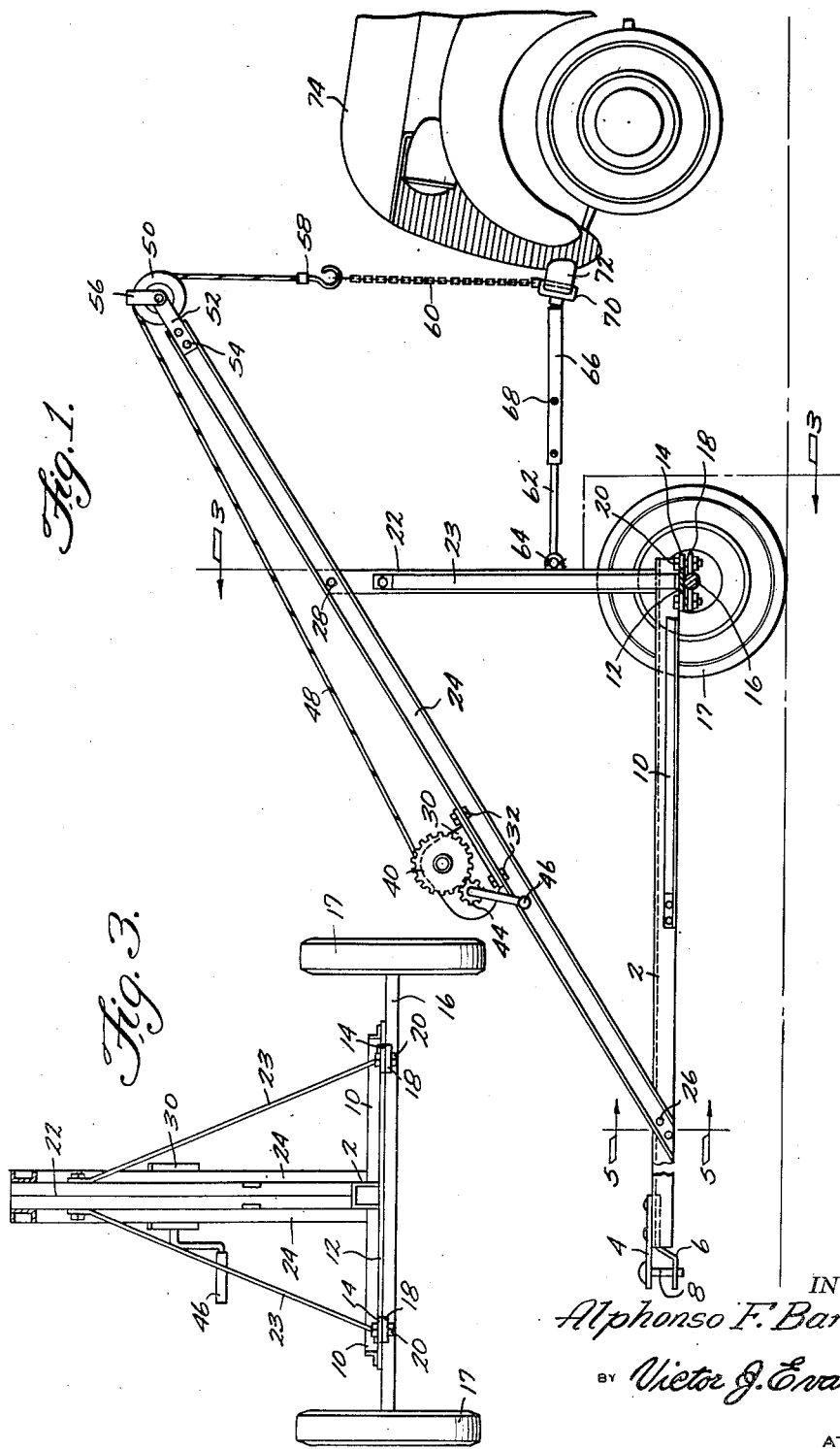
INVENTOR.
*Alphonso F. Barhorst,*
BY *Victor J. Evans & Co.*
ATTORNEYS May 15, 1951
A. F. BARHORST
PORTABLE DERRICK
2,553,229
Filed June 7, 1948
2 Sheets-Sheet 2
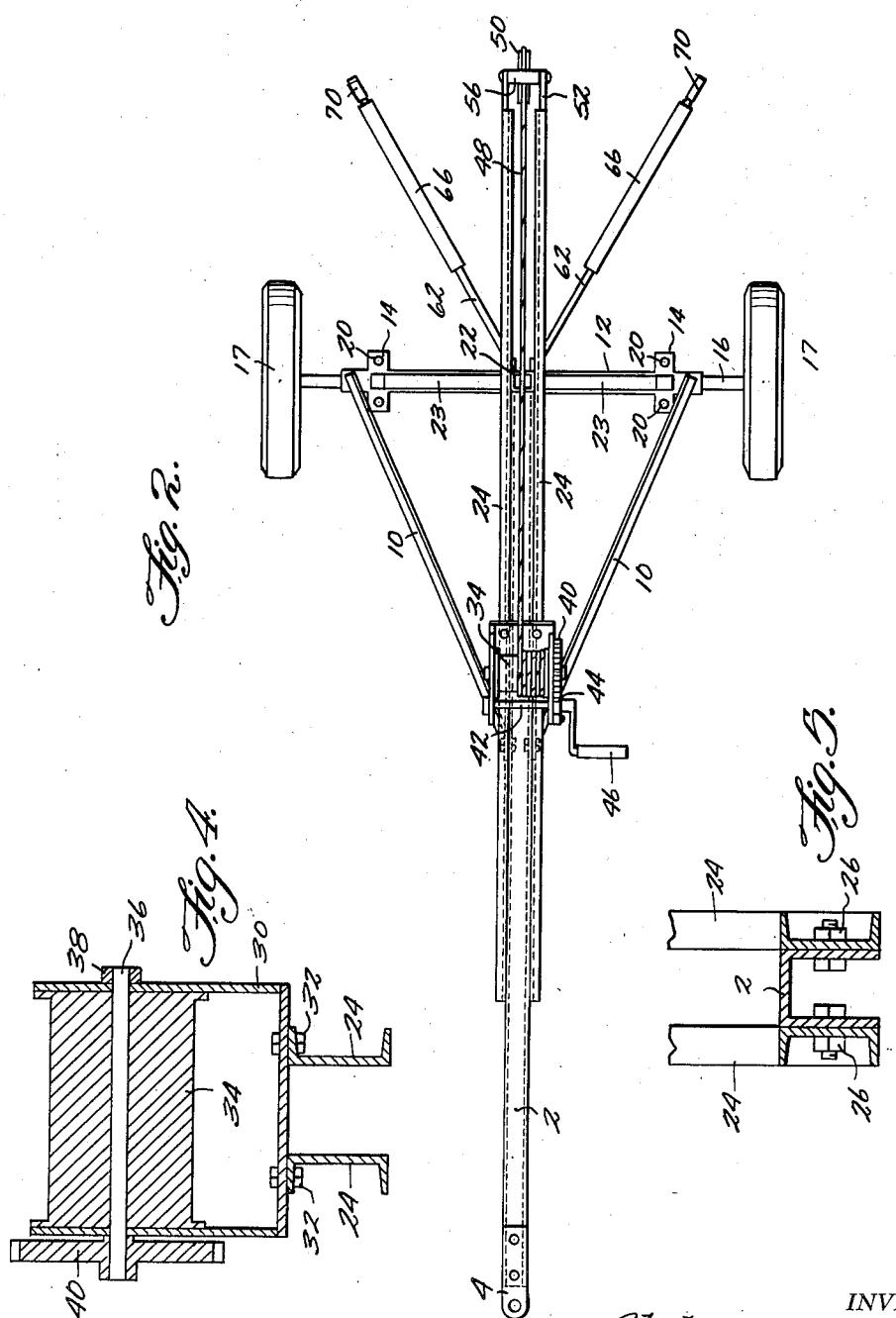
INVENTOR.
Alphonso F. Barhorst,
BY Victor J. Evans & Co.
ATTORNEYS Patented May 15, 1951

2,553,229

UNITED STATES PATENT OFFICE 2,553,229

PORTABLE DERRICK

Alphonso F. Barhorst, Anna, Ohio

Application June 7, 1948, Serial No. 31,541

1 Claim. (Cl. 214—86)

My present invention relates to an improved portable derrick of the type especially adapted for use in elevating and towing disabled motor vehicles and comprising generally a wheeled frame designed to be drawn by an automobile and having a boom supported pulley and chain mechanism for raising the front or rear of a disabled vehicle.

By the use of the portable derrick of my invention, the need for specially built wrecking cars is eliminated and any automobile of average weight may be employed to pull the portable derrick and the derrick in turn will raise and support in towing relation the disabled vehicle.

In the accompanying drawings I have illustrated one complete example of the physical embodiment of my invention according to the best mode I have thus far devised but it will be understood that various changes and alterations may be made in the exemplified structure within the scope of the appended claim.

In the drawings:

Figure 1 is a side elevational view of the portable derrick of my invention showing the disabled vehicle in elevated position.

Figure 2 is a top plan view of the derrick.

Figure 3 is a sectional view at line 3—3 of Figure 1.

Figure 4 is an enlarged detail sectional view through the pulley drum.

Figure 5 is a sectional view at line 5—5 of Figure 1.

Referring now to the drawings wherein I have illustrated the present preferred form of my invention I utilize in carrying out my invention a base frame member 2 of channel iron having front spaced brackets 4 and 6 for the draft pin 8 which may be connected suitably to the draft vehicle, normally an automobile.

Intermediate the length of the base member 2 I position lateral angular braces 10 for the transverse frame 12 which has lugs 14 to secure the axle 16 having wheels 17 by means of plates 18 retained by bolts 20.

Extending upwardly from the member 2 and the frame 12 I employ a standard 22 braced as at 23 to angularly support the boom members 24 also of channel iron bolted to the member 2 at 26 and to the standard 22 at 28.

On the boom members 24 between their supported points I use a yoke 30 bolted at 32 and supporting a cable drum 34 on axle 36 having on one end a securing collar 38 and on the other end a gear 40. Also in the yoke I provide a shaft 42 having a pinion 44 meshing with gear 40 and a crank 46 is provided to enable the operator to rotate the drum and wind the cable 48.

The cable extends upwardly to the end of the boom and then passes over a sheave 50 in arms 52 secured at 54 and provided with a guard 56, and the cable at its end has a hook 58 for attachment as to a chain 60.

Extending divergently from the standard 22 I use a pair of bars 62 pivoted at 64 and having telescoping tubes 66 which may be adjustably secured by pins 68. Grips 70 on the ends of chain 60 and attached to the ends of the tubes 66 may be secured to the bumper 72 of the vehicle 74 to be towed.

From the above description it will be clear that so long as the weight of the draft vehicle equals or exceeds the weight of the vehicle to be towed, the disabled vehicle may be raised by the derrick and towed. The bars and tubes 62 and 64 will minimize side sway of the raised vehicle, and obviously the derrick may be attached and detached from any selected vehicle of average weight to act as a towing car.

Having thus fully described my invention what I claim as new and desire to secure by Letters Patent is:

A portable derrick comprising an elongated channel shaped base member, a wheeled frame connected to one end of said base member, means connected to the opposite end of said base member whereby said wheeled frame is adapted to be drawn by an automobile, a vertical standard on the wheeled frame located above the axis of the wheels, the said wheeled frame and standard forming the base and altitude of a right angle triangle, angular braces secured to said standard and said frame, a boom inclined upwardly and rearwardly in supported relation on the base member and the standard and forming the hypotenuse of the triangle and extending beyond the triangle base, and cable means on the boom to elevate the vehicle to be towed and rigid draft means between the standard and the towed vehicle, said means comprising telescopic tubular members connected at a common point on said standard and extending in opposite angular directions from said common point.

ALPHONSO F. BARHORST.

REFERENCES CITED

The following references are of record in the file of this patent:

UNITED STATES PATENTS

| Number | Name | Date |
| --- | --- | --- |
| 1,113,408 | Burlingame | Oct. 13, 1914 |
| 1,402,074 | Kloehn | Jan. 3, 1922 |
| 1,420,369 | Duken | June 20, 1922 |
| 1,435,065 | Holmes | Nov. 7, 1922 |
| 1,551,132 | Butler | Aug. 25, 1925 |
| 1,794,148 | Collins | Feb. 24, 1931 |
| 2,283,443 | Klein | May 19, 1942 |
| 2,428,085 | Largen | Sept. 30, 1947 |
| 2,497,379 | Vandergrift, Sr., et al. | Feb. 14, 1950 |